Patented May 22, 1934

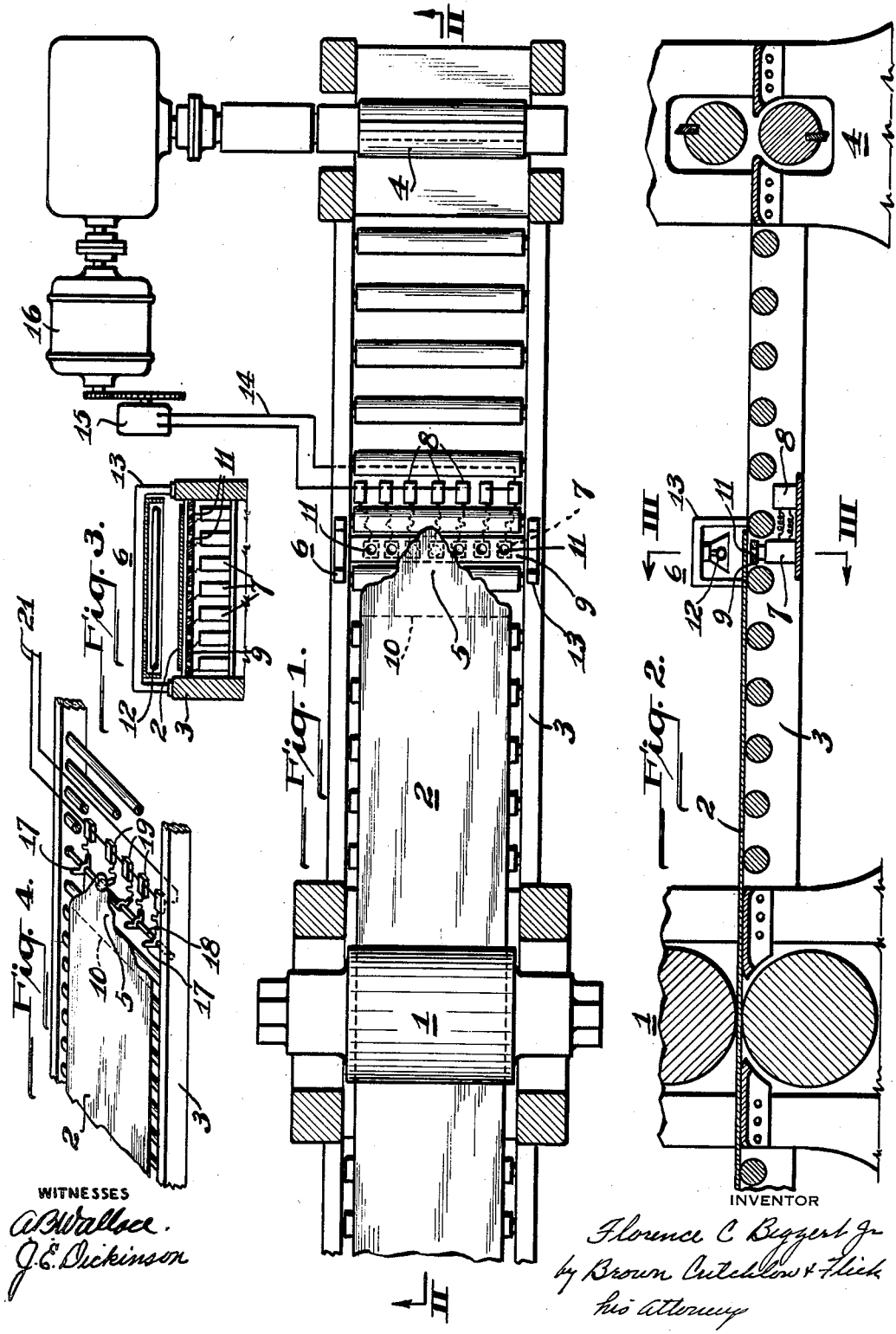

1,959,851

UNITED STATES PATENT OFFICE 1,959,851

CIRCUIT CONTROL

Florence C. Biggert, Jr., Crafton, Pa., assignor to United Engineering & Foundry Company, Pittsburgh, Pa., a corporation of Pennsylvania Application March 14, 1933, Serial No. 660,623

9 Claims. (Cl. 164—68)

This invention pertains to electrical controllers, and, while not necessarily so limited in its use, relates more particularly to a controller for automatically controlling the operation of a flying shear in such a way that it will accurately remove, from a piece of strip fed into it, the crop end which is present on the strip when it leaves the mill, and which must be removed before the strip is cut into commercial lengths.

According to the prevailing practice, a single flag switch is employed for this purpose, being placed in front of the shear in a position to be engaged by the strip as it is fed thereinto, and connected in a control circuit which is adapted to synchronize the entrance of the strip in the shear with the cutting operation of the shear blades. The difficulty of such practice is that, due to the variations in the shapes of the crop ends on different strips, the operation of the switch has no relation to the actual length of the crop ends. Consequently, to insure all the crop being removed, the switch must be set to produce a cropping cut which will take care of all shapes and lengths encountered. This results in the loss of a considerable amount of good material, and especially so in the wider strips where the irregularities in shape of the crop ends are most amplified.

With this problem in mind, it is the object of this invention to provide a controller for governing the operation of a flying shear which is adapted to be arranged in the path of the strip and to be responsive to the inner, rather than the exposed end of the crop portion of the strip, whereby eliminating any discrepancies in the length of the cropping cut due to irregularities in the shape of the crop.

A more particular object is to provide a controller of this character which is simple and sturdy of construction, easy to install, and dependable in operation.

These and various objects, as well as the various other novel features and advantages of the invention, will be apparent when the following detailed description is read in conjunction with the accompanying drawing, of which Fig. 1 is a view partly in section and partly in plan of a rolling mill and shear installation embodying the invention; Fig. 2 a sectional view taken on the line II—II of Fig. 1; Fig. 3 a section taken on the line III—III of Fig. 2; and Fig. 4 a perspective view of a modification of the invention.

Referring in detail to the drawing, the numeral 1 designates generally a rolling mill, and the numeral 2 a piece of strip being discharged therefrom onto a roll table 3, which is employed to deliver the strip into a rotary type flying shear 4, provided for cutting the strip into commercial lengths as it leaves the mill. As illustrated in Fig. 1, strip of this character usually has a crop end 5 on it when it leaves the mill which is of a very irregular shape and of imperfect quality, and which it is necessary to remove from the commercial lengths produced for the market.

To insure the crop being fully removed by the first cut of the shear, it is of course necessary that at least all of it be past the shear when the first cut is made. According to this invention, for accurately accomplishing this end, a controller 6 is provided which consists of a plurality of switches that are adapted to be mounted in spaced relation in the path of the strip and in a line disposed at right angles to the movement of the strip. As shown in Figs. 1, 2 and 3, these switches may consist of a plurality of photo-electric cells 7 and relays 8, the latter being connected to the cells for operation. Over the complete series of these cells 7, in a plane lying below the path of the strip, a plate or shield 9 is mounted, being provided with a series of openings 11 located to register with the light-receiving openings, not shown, in the various cells. Above such shield, in a position to project its rays through the openings 11 therein and into the cells 7 for exciting them, is mounted a lamp 12 which is supported in a suitable frame 13, attached to the roll table 3.

In this embodiment of the invention, the cells 7 are constructed to close the relays 8 only when they are shut off from the light of the lamp 12, and the relays 8 are all connected in series circuit relation in a circuit 14, connected to a controller 15 which is used to control the operation of a driving motor 16, coupled to the shear. Hence, as the cells 7 are spread out across the full width of the strip, the control circuit 14 is not energized until all of the irregular portions on the end of the strip are past the openings 11 in the shield 9. This means that the circuit 14 is not closed by the controller 6 until the inner end of the crop, indicated by the dotted line 10, is moved past it. The chief advantage of this is, that the controller can be set to accurately time the entrance of the end of the crop in the shear, and thereby eliminate all such losses as have resulted from the prior practice where the variations in the shape of the crop ends had to be taken into consideration in the adjustment of the single flag switch employed for such purpose. It will, of course, be appreciated that the number of switches employed in the controller may be varied, although no less than three should be used; also, that the connection of the photo-electric cells and relays may be varied or adjusted to accord with different widths of stock.

As illustrated in Fig. 4, in place of photo-electric cells, a series of trigger-type flags 17 or their equivalents may be used in the controller. These, as shown in this figure, are mounted on a rod 18 along which they may be adjusted, to accord with the width of the strip 2, and connected to operate a series of contactors 19 which in turn are connected in series circuit relation in a circuit 21 which may be connected to the shear control proper, as described above. Obviously, the closing of the shear circuit by the flags may be accomplished in various other ways, and various other systems for synchronizing the entrance of the strip in the shear to regulate the cropping cuts may be used in accordance with this invention.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A controller for controlling the operation of a flying shear or the like in response to the approach of a piece of stock being fed thereinto, comprising a plurality of switches adapted to be mounted in spaced relation across the path of the stock for operation thereby, and control means rendered operative by the combined operation of said switches.

2. A controller adapted to be mounted in the path of the stock being fed into a work device such as a flying shear for controlling the operation thereof in response to the approach of the stock, said controller comprising a plurality of elements adapted to be arranged in spaced relation across the path of the stock for operation thereby, and means responsive to the operation of said elements collectively for controlling the operation of the work device.

3. A controller for controlling the operation of a flying shear or the like in response to the approach of a piece of stock being fed thereinto, comprising a plurality of stock-responsive elements adapted to be arranged in spaced relation in a straight line across the path of the stock for operation thereby, and control means rendered operative by the collective operation of said elements.

4. A controller for controlling the operation of a flying shear or the like in response to the approach of a piece of stock being fed thereinto, comprising a plurality of photo-electric cells mounted in spaced relation adjacent the delivery path of stock and in a line at right angles thereto, a lamp disposed to project its light rays into said cells from a point on the opposite side of the path of the stock whereby rendering the operation of said cells responsive to the passage of a piece of stock between said lamp and said cells, and means responsive to the collective operation of said cells for controlling the operating of a shear.

5. A controller for controlling the operation of a flying shear or the like in response to the approach of a piece of stock being fed thereinto, comprising means for driving a shear, a plurality of photo-electric cells mounted in spaced relation above or below the delivery path of the stock and in a line at right angles thereto, a lamp disposed to project its light rays into said cells from a point on the opposite side of the path of the stock whereby rendering the operation of said cells responsive to a piece of stock as it passes between said lamps and the cells, a relay connected to each of said cells for operation thereby, means for connecting said relays in series circuit relation with one another, and means responsive to the collective operation of said cells for controlling the operation of said driving means.

6. A controller for controlling the operation of a work machine in response to the delivery of a piece of strip material thereinto, comprising means for driving said machine, a series of flags adapted to be arranged in aligned spaced relation across the path of the stock and disposed for operation thereby, a control circuit, means for closing said circuit by the combined operation of said flags, and means for utilizing said control circuit for controlling the operation of said driving means.

7. A controller for controlling the operation of a work machine in response to the delivery of a piece of strip material thereinto, comprising means for driving said work machine, a series of flags adapted to be arranged in spaced aligned relation across the path of the stock and disposed for operation thereby, a contactor operably coupled to each of said flags, a controlling circuit, means for connecting said contactors in series circuit relation in said circuit, and means for utilizing said circuit to control the operation of said driving means.

8. A controller for controlling the operation of a flying shear or the like in response to the approach of a piece of stock being passed therethrough, comprising a switching mechanism having sensing means operable only in response to a predetermined width of the stock therepast, and control means rendered operative by the actuating of said switching mechanism for controlling said shear.

9. A controller for controlling the operation of a work machine in response to the delivery of a piece of strip material thereto, comprising means for driving said machine, a control circuit for controlling the operation of said driving means, a switching mechanism for controlling said circuit arranged in the path of the strip in spaced relation with said work machine and having sensing means operable only in response to the movement therepast of a predetermined width of strip.

FLORENCE C. BIGGERT, Jr.